United States Patent [19]

Couperus

[11] 4,245,732
[45] Jan. 20, 1981

[54] COMPACTLY FOLDABLE RADIAL LUFFING STACKER

[75] Inventor: Egbert Couperus, Belleville, Canada

[73] Assignee: Allis-Chalmers Canada, Limited, Lachine, Canada

[21] Appl. No.: 53,433

[22] Filed: Jun. 29, 1979

[51] Int. Cl.³ .................... B65G 15/22; B65G 21/10
[52] U.S. Cl. ................................ 198/313; 178/318; 178/632
[58] Field of Search ............... 198/313, 316, 318–320, 198/632, 864, 865, 950; 414/523; 187/9 E

[56] References Cited

U.S. PATENT DOCUMENTS

| | | | |
|---|---|---|---|
| 2,632,556 | 3/1953 | Alpers et al. | 198/313 |
| 3,208,556 | 9/1965 | Shaffer | 187/9 E |
| 3,372,791 | 3/1968 | Kennedy | 198/313 X |
| 3,444,987 | 5/1969 | Palmer | 198/313 X |

FOREIGN PATENT DOCUMENTS 472030 2/1929 Fed. Rep. of Germany ........... 198/313

Primary Examiner—Joseph E. Valenza
Assistant Examiner—Douglas D. Watts
Attorney, Agent, or Firm—Charles L. Schwab

[57] ABSTRACT

An elevating conveyor for a portable luffing stacker adapted to be collapsed and folded from an erected operational position to a compactly folded transport position. An elevating conveyor frame, which supports an endless belt conveyor has five frame sections pivotally connected to each other an canted to permit compact folding of the frame sections. A mast structure, which supports the elevating conveyor frame when in its operational position, includes a tower mast section pivotally foldable relative to a base mast section to a horizontal transport position about a substantially horizontal first pivotal axis and a telescopic mast section supporting the elevating conveyor frame which is telescopically movable relative to the tower mast structure upwardly to an operational position or downwardly to a retracted transport position. When in retracted position, the telescopic mast section is foldable to transport position about a horizontal second pivotal axis which coincides with the axis about which the tower mast section structure folds to transport position. A unique hydraulic ram and chain arrangement provides vertical movement of the telescopic mast section and the attached elevating conveyor frame.

14 Claims, 16 Drawing Figures

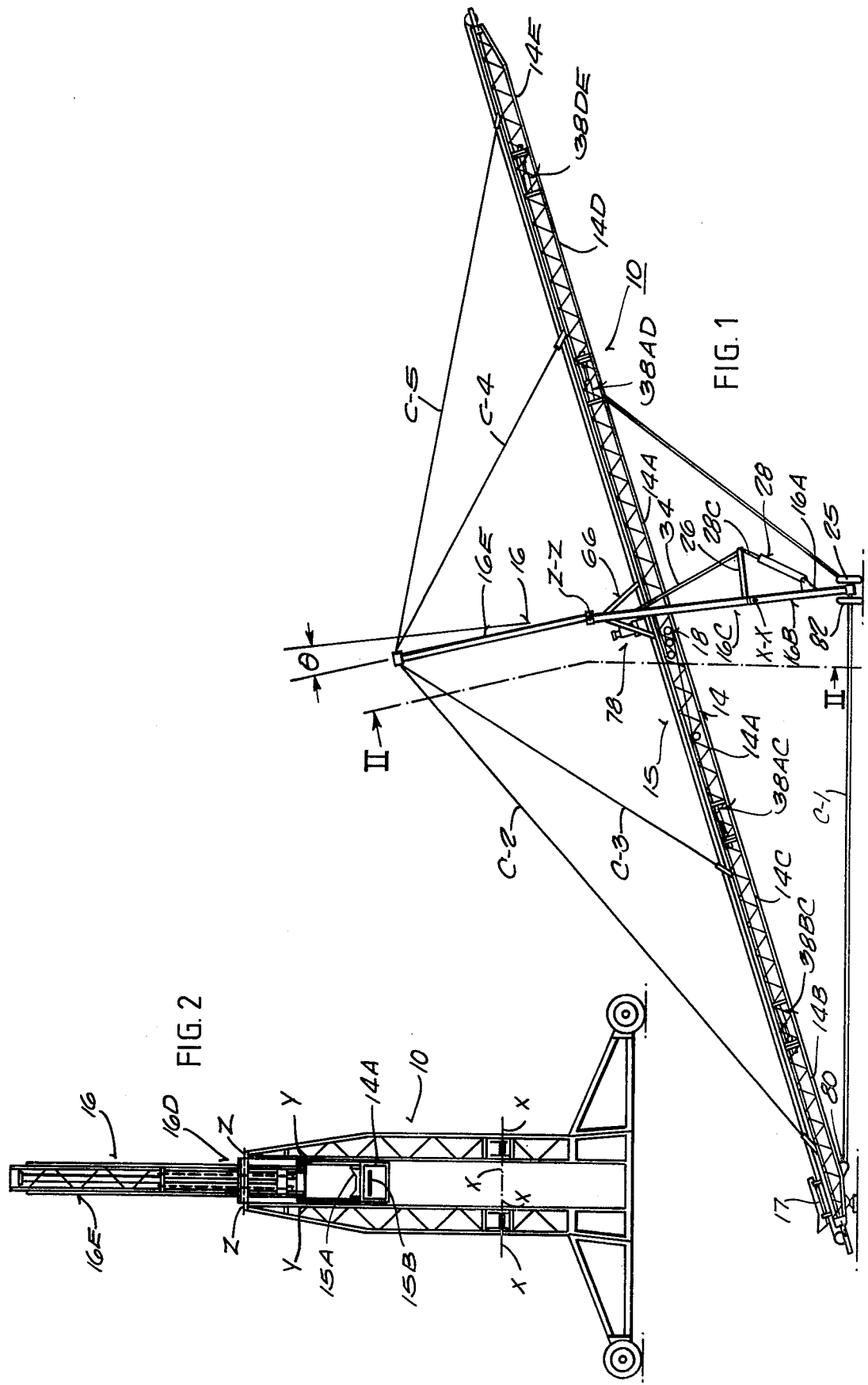

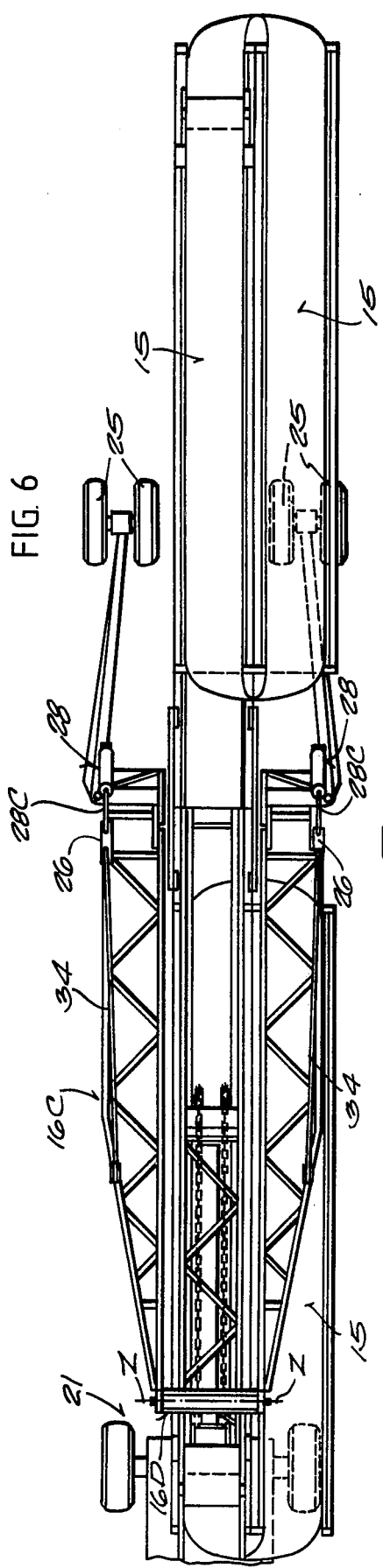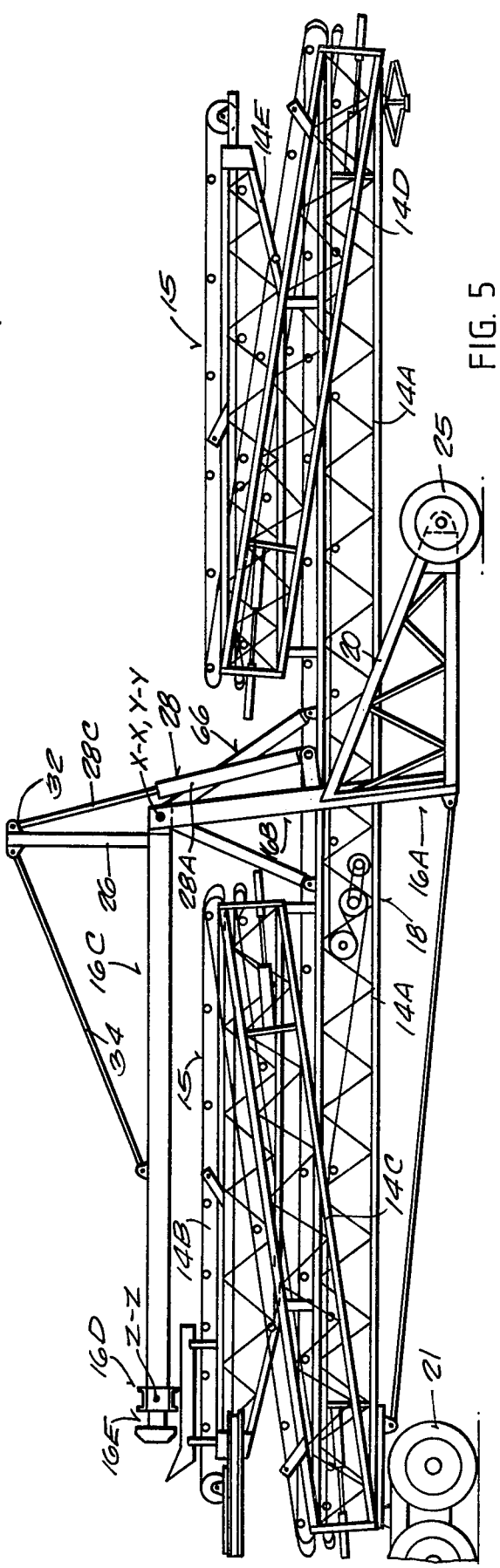
FIG. 6
FIG. 5

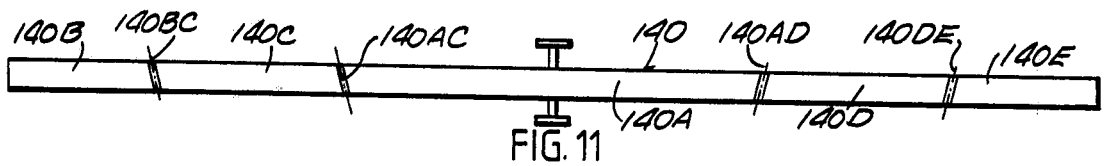
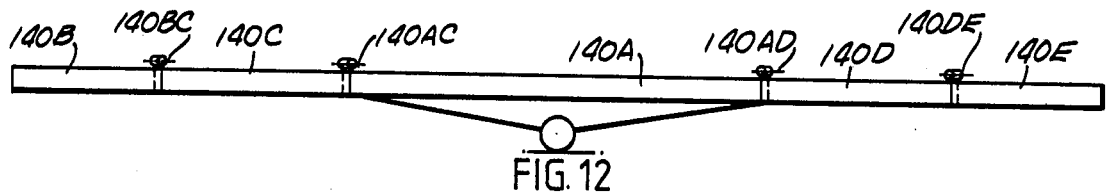
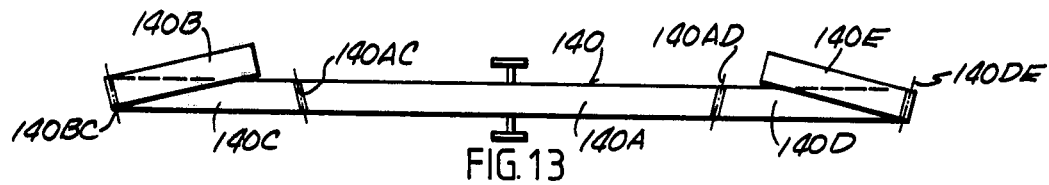
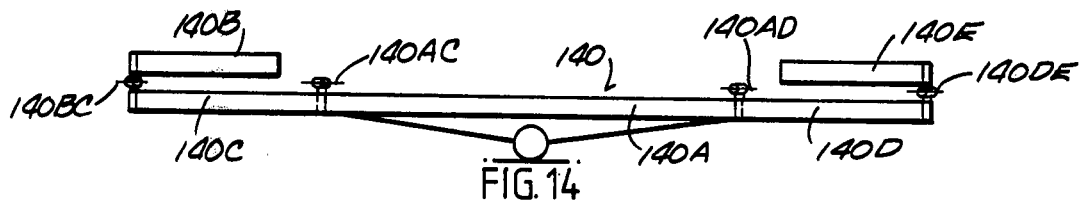
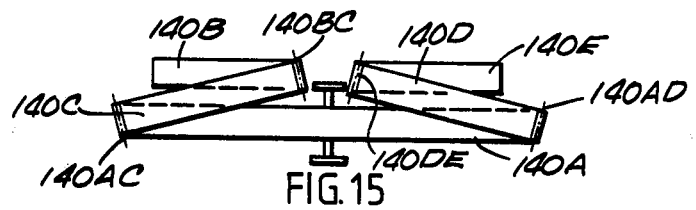
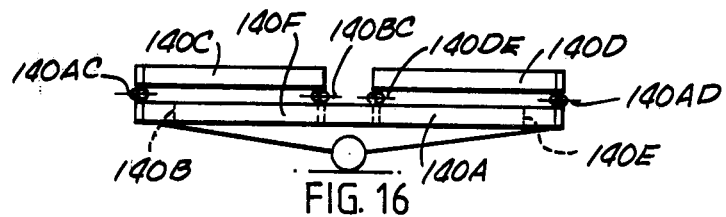

COMPACTLY FOLDABLE RADIAL LUFFING STACKER

TECHNICAL FIELD

This invention relates to portable radial luffing stackers comprising an elevating conveyor used for stockpiling bulk material such as aggregate (crushed rock), mineral ore, coal, sand, or the like, and more particularly to an apparatus of this type which can be compactly folded for transportation.

DESCRIPTION OF THE PRIOR ART

The following U.S. Pat. Nos. are illustrative of the prior art relating to portable elevating conveyors or the like: 1,512,382 issued to Edward J. Walsh on Oct. 21, 1924; 1,607,601 issued to George W. Behnke et al on Nov. 23, 1926; 3,085,675 issued to John M. Feiteira, Jr. on Apr. 16, 1963; 3,444,987 issued to Marion L. Palmer on May 20, 1969; 3,552,546 issued to James D. Rath on Jan. 5, 1971 and 3,616,893 issued to Orlin L. Knadle et al on Nov. 2, 1971.

STATEMENT OF THE INVENTION

It is an object of the present invention to provide a portable radial luffing stacker used for stock-piling bulk materials such as aggregate, mineral ore, sand, coal and the like and which can be compactly folded upon itself for ease of transportation.

It is a further object of the invention to provide an elevating conveyor which may be used in a portable radial luffing stacker or the like and comprising a plurality of hinged conveyor supporting frame sections which are adapted to be folded upon each other in such manner as to occupy a minimum of vertical head room and a minimum lateral space during transportation, and also so as to minimize the power required to accomplish the folding operation.

It is another object of the invention to provide an elevating conveyor support frame which may be incorporated in a portable radial luffing stacker or the like, and a mast structure for suspending the conveyor support frame in operative elevating position, and in which the elevating conveyor and the mast structure are both foldable to a compact transport position.

It is another object of the invention to provide a mast structure for supporting an elevating conveyor in operative elevating position, in which the mast structure includes a normally inner mast section and a normally outer mast section, in which one of said mast sections is telescopically movable relative to the other of said mast sections, and in which said inner and said outer mast sections are foldable in unison to transport position about aligned pivotal axes.

It is still another object of the invention to provide a mast structure for supporting an elevating conveyor in operative elevating position in which the mast structure includes a first relatively stationary mast section and a second mast section which is telescopically movable relative to the first mast section, the telescopically movable mast section including a hydraulic ram arrangement which is vertically movable by a "bootstrap" operation to impart corresponding vertical movement to the telescopic mast section and to the elevating conveyor, whereby to either raise the elevating conveyor to operational position or to lower the elevating conveyor to a non-operative position.

In achievement of these objectives, there is provided in accordance with the invention, a portable elevating conveyor for use in a luffing stacker or the like and adapted to be collapsed and folded from an erected opertional position to a compactly folded transport position, comprising a multi-section conveyor frame adapted to support a conveyor means, an elongated conveyor means supported by said conveyor frame, said multi-section frame comprising a plurality of contiguous frame sections pivotally connected to each other, said frame sections being movable to an operational position about their corresponding pivotal axes to form an elongated conveyor supporting frame in which the plurality of sections lie on a common longitudinal axis, each pair of contiguous frame sections being pivotally mounted with respect to each other about a corresponding canted pivotal axis to permit compact folding of said frame sections.

In one embodiment of the invention, each pair of contiguous frame sections are pivotally mounted with respect to each other about a corresponding upright pivotal axis, which is canted or inclined relative to a vertical line perpendicular or normal to the longitudinal axis of the conveyor supporting frame; while in another embodiment of the invention, each pair of contiguous frame sections are pivotally mounted with respect to each other about a horizontal axis which is canted or inclined relative to a horizontal line normal to the longitudinal axis of the conveyor supporting frame.

Another inventive aspect comprises an elongated conveyor supporting framework, a mast structure comprising a tower mast section mounted on a base mast section, and a telescopic mast section telescopically movable relative to said tower mast section, and means connecting the lower end of said telescopic mast section to said conveyor supporting framework whereby vertical upward or downward movement of said telescopic mast section is imparted to said conveyor supporting framework.

In another inventive aspect, the means for imparting vertical movement to the telescopic mast section comprises a hydraulic ram assembly forming part of and movable with said telescopic mast section, said hydraulic ram assembly comprising a ram cylinder element, a piston movable in said cylinder and a piston rod element carried by and movable with said piston and projecting beyond the end of said cylinder, slide means carried by and movable with one of said elements, a rotatable idler means rotatably mounted on said slide means, a flexible member such as a chain or the like, one end of said flexible member being anchored to said tower mast section, said flexible member being trained around said idler means, with the opposite end of said flexible member being anchored to the other of said elements.

In a further inventive aspect, the tower mast section is mounted for folding pivotal movement relative to said base mast section about a substantially horizontal first pivotal axis to move said mast structure from an operational to a transport position or vice-versa, link means connect the lower end of said telescopic mast section to said conveyor supporting framework, whereby vertical upward or downward movement of said telescopic mast section is imparted to said conveyor supporting framework, said link means being pivotally connected to said telescopic mast section, whereby to define a substantially horizontal second pivotal axis, said telescopic mast section being movable vertically downwardly relative to said tower mast section to a retracted position in which said second pivotal axis at said lower end of said telescopic mast section coincides with said first pivotal axis between said tower mast section and said base mast section, whereby said tower mast section may be folded about said first pivotal axis relative to said base mast section simultaneously with and together with the folding of said telescopic mast section relative to said link means about said second pivotal axis.

Further objects and advantages of the invention will become apparent from the following description taken in conjunction with the accompanying drawings in which:

BRIEF DESCRIPTION OF THE DRAWINGS

FIG. 1 is a view of the portable radial luffing stacker dismounted from the towing vehicle and fully erected and in operational position;

FIG. 2 is a view taken along line II—II of FIG. 1;

FIG. 5 is a view in longitudinal elevation of the portable radial luffing stacker mounted on the towing vehicle for transport and with the conveyor supporting frame and mast structure being folded for transport;

FIG. 6 is a top plan view of the portable radial luffing stacker in the transport position of FIG. 5;

FIG. 11 is a schematic top plan view of a modified multi-section conveyor supporting framework in which contiguous conveyor frame sections are pivotally connected to each other about a canted pivotal axis lying in the horizontal plane, with the framework being shown in elongated extended (non-folded) position;

FIG. 12 is a schematic view in longitudinal elevation of the conveyor supporting frame of FIG. 11 in the same extended position as in FIG. 11;

FIG. 13 is a schematic top plan view of the conveyor supporting frame of FIGS. 11 and 12, but with the outermost wing frame section at each end being folded about its corresponding canted pivotal axis with respect to the middle frame section;

FIG. 14 is a view in longitudinal elevation of the conveyor supporting framework in the same position as in FIG. 13;

FIG. 15 is a schematic top plan view of the conveyor supporting frame of FIGS. 13 and 14, but with the two ring sections at each end of the middle frame section which are already folded on each other, now being folded about the canted pivotal axis between each respective inner wing frame section and the middle frame section; and FIG. 16 is a view in longitudinal elevation of the conveyor supporting framework in the position of FIG. 15.

DESCRIPTION OF THE PREFERRED EMBODIMENT

Figure 3:
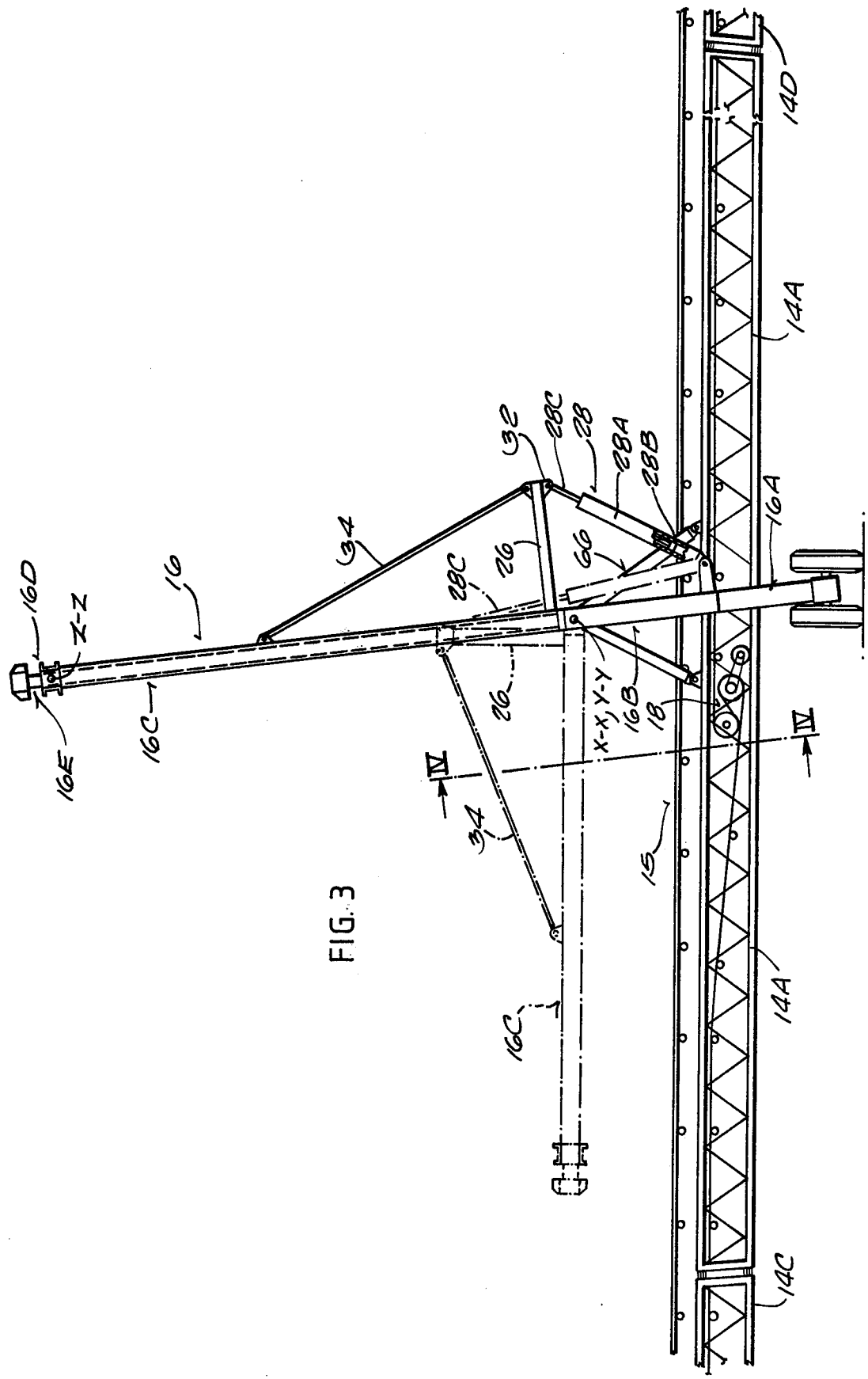
FIG. 3 is a view of the portable radial luffing stacker with the supporting framework for the belt conveyor being shown in lowered non-operative position; and with the mast structure being shown in full line in erected but telescoped condition and in phantom line in transport position.

Referring now to the drawings and more particularly to the views of FIGS. 1 and 2, there is shown a portable radial luffing stacker generally indicated at 10 comprising an elevating conveyor supporting frame generally indicated at 14 and a mast structure generally indicated at 16. Conveyor supporting frame 14 supports a belt conveyor 15 which is adapted to receive a bulk material such as aggregate (crushed rock), sand, mineral ore, or coal, which is delivered to a hopper 17 at the lower end of the conveyor frame, with the bulk material received by hopper 17 being discharged by hopper 17 onto belt conveyor 15. Belt conveyor 15 elevates the bulk material and discharges the material at the upper end of the conveyor into a stockpile or the like. Belt conveyor 15 includes an upper run 15A and a lower run 15B (FIG. 4) which are trained around suitable drive and driven rolls mounted on conveyor supporting frame 14. A suitable drive means for belt conveyor 15, generally indicated at 18, is mounted on main conveyor frame section 14A and includes an electric drive motor. Stacker 10 is adapted to be transported by a towing vehicle generally indicated at 21 (FIGS. 5 and 6).

The conveyor supporting frame generally indicated at 14 comprises a plurality of hingedly or pivotally connected elongated frame sections including a centrally located middle frame section 14A, two wing frame sections 14B and 14C which are to the left of or below main frame section 14A relative to the erected operative condition of the apparatus shown in FIG. 1, and two additional wing frame sections 14D and 14E which are to the right of or above main frame section 14A with respect to the erected operational view shown in FIG. 1. As best seen in the views of FIGS. 4 and 10, conveyor support frame 14 is a hollow, box-like structure which supports on the upper surface thereof idler rolls 23 for upper run 15A of belt conveyor 15. As will be explained in more detail hereinafter in the embodiment of the invention illustrated in FIGS. 1–10, inclusive, each of the respective frame sections 14A–14E, inclusive, is pivotally or hingedly connected to a corresponding adjacent frame section by hinges or pivots lying on an upright axis which is canted with respect to a line slave normal to the longitudinal axis of conveyor supporting frame 14, with the result that when adjacent frame sections are folded upon each other to the transport position as shown in FIGS. 5 and 6, the folded conveyor frame sections occupy a minimum of space in a direction laterally of the longitudinal axis of the framework and thus also laterally of the direction of travel of the towing vehicle, and also minimize the head room in a vertical direction occupied by the folded frame sections.

The portable radial luffing stacker 10 includes a mast structure generally indicated at 16 which is of "A-frame" construction and includes a lower base section generally indicated at 16A, an upper base section generally indicated at 16B, and an upper or "tower" mast section 16C which is pivotally connected at its lower end to the upper end of upper base section 16B whereby to permit tower mast section 16C to fold about a horizontal pivotal axis X—X (FIGS. 2 and 4) to substantially a horizontal position for transport as seen in the views of FIGS. 5 and 6. Each of the respective mast sections generally indicated at 16A, 16B and 16C is formed of two laterally spaced-apart column portions such as 16A-1, 16A-2, 16B-1, 16B-2, 16C-1 and 16C-2.

The lateral spacing between the two sections of each of the mast sections, such as 16B-1, 16B-2, etc., defines a well or cavity which extends for the entire length or height of the mast sections 16A, 16B and 16C, which well or cavity receives an inner mast section generally indicated at 16E which is telescopically movable relative to mast sections 16A, 16B and 16C from a retracted position such as that seen in FIGS. 3, 4, 5 and 6 to an extended position such as that shown in the operative position of FIGS. 1 and 2. Telescopically movable inner mast section 16E supports middle conveyor frame section 14A by means of V-shaped or U-shaped links 66 which are pivotally connected at the respective upper ends thereof about an axis Y—Y (FIGS. 2, 4 and 10) to the lower end of telescopic inner mast section 16E and at the respective lower ends thereof to middle conveyor frame section 14A substantially centrally of the length of frame section 14A.

At the upper end of tower mast section 16C a transverse bridging member 16D is pivotally supported by the upper ends of the laterally spaced sections 16C-1 and 16C-2 of tower mast section 16C, whereby bridging member 16D is pivotally movable about a substantially horizontal pivotal axis Z—Z (FIGS. 2, 4 and 10). Bridging member 16D is provided with a passage therethrough which receives and guides telescopic inner mast member 16E during its vertical telescopic movement with respect to tower mast section 16C. When telescopic inner mast section 16E is in the fully erected position as shown in FIGS. 1 and 2, it is inclined or tilted at an angle $\theta$ such as 6° in a counterclockwise direction relative to FIG. 1 out of alignment with A-frame mast sections 16A, 16B, 16C. During the retracting movement of telescopic inner mast section 16E from the fully erected position of FIGS. 1 and 2 to the fully retracted position of FIGS. 3, 4, 5 and 6, telescopic mast section 16E swings from the inclined position of FIGS. 1 and 2 to the in-line position relative to mast sections 16A, 16B and 16C, of FIGS. 3-6, inclusive. During the movement of telescopic mast section 16E from retracted to erected position, or alternatively, from erected to retracted position, the pivotally mounted bridging member 16D accommodates by its pivotal movement the changing angular relation of telescopic mast section 16E relative to A-frame mast sections 16A, 16B and 16C.

Since telescopic inner mast section 16E supports and is physically connected at its lower end to intermediate or middle conveyor frame section 14A by means of connecting links 66, vertical upard or downward movement of telescopic inner mast section 16E carries with it conveyor frame section 14A and hence also carries with it conveyor frame sections 14B, 14C, 14D and 14E which are connected either directly or indirectly to middle conveyor frame section 14A. The changing angular position of telescopic mast section 16E relative to the rest of mast structure 16 is caused by the changing angular position of conveyor frame 14 in moving from retracted to erected position or vice-versa.

Lower base section 16A of mast 16 has pivotally secured to the laterally opposite sides thereof a pair of wheel support brackets 20 each of which respectively supports a wheel member 25. When radial stacker 10 is in operating position, as seen in FIGS. 1 and 2, in which mast structure 16 is in its fully erected condition, or when stacker apparatus 10 is in the position shown in FIGS. 3 and 4, in which mast structure 16 is in a partially erected condition, wheel support brackets 20 are swung about their pivotal connection to lower mast section 16A to extend laterally of the longitudinal axis of conveyor supporting frame 14. When stacker apparatus 10 is in the transport position shown in FIGS. 5 and 6, wheel support brackets 20 are swung about their pivotal connections to lower mast section 16A so as to extend parallel to the longitudinal axis of middle conveyor frame section 14A and parallel to the direction of travel of the towing vehicle, with wheels 25 then being supported by brackets 20 for rotation about an axis which extends transverse of the longitudinal axis of middle conveyor frame section 14A.

In order to effectuate the erecting movement of tower mast section 16C and of the telescoped inner mast section 16E which is received within tower mast section 16C, a pair of erecting arms 26 are rigidly secured to tower mast section 16C contiguous but spaced from the pivotal axis X—X about which mast section 16C pivots with respect to mast section 16B. A separate double acting hydraulic ram generally indicated at 28 is operatively connected to each erecting arm 26, each ram 28 including a ram cylinder 28A which is pivotally connected to outer mast section 16B below pivotal axis X—X, a piston 28B (not shown) movable within cylinder 28A, and a piston rod 28C extending from piston 28B and pivotally connected at the outer end thereof to the outer end of the corresponding erecting arm 26 at pivot point 32. A separate rigid link 34 is pivotally connected at one of its ends to the outer end of a corresponding one of the erecting arms 26 and at the opposite end thereof to outer mast section 16C intermediate the length of mast section 16C.

Figure 4:
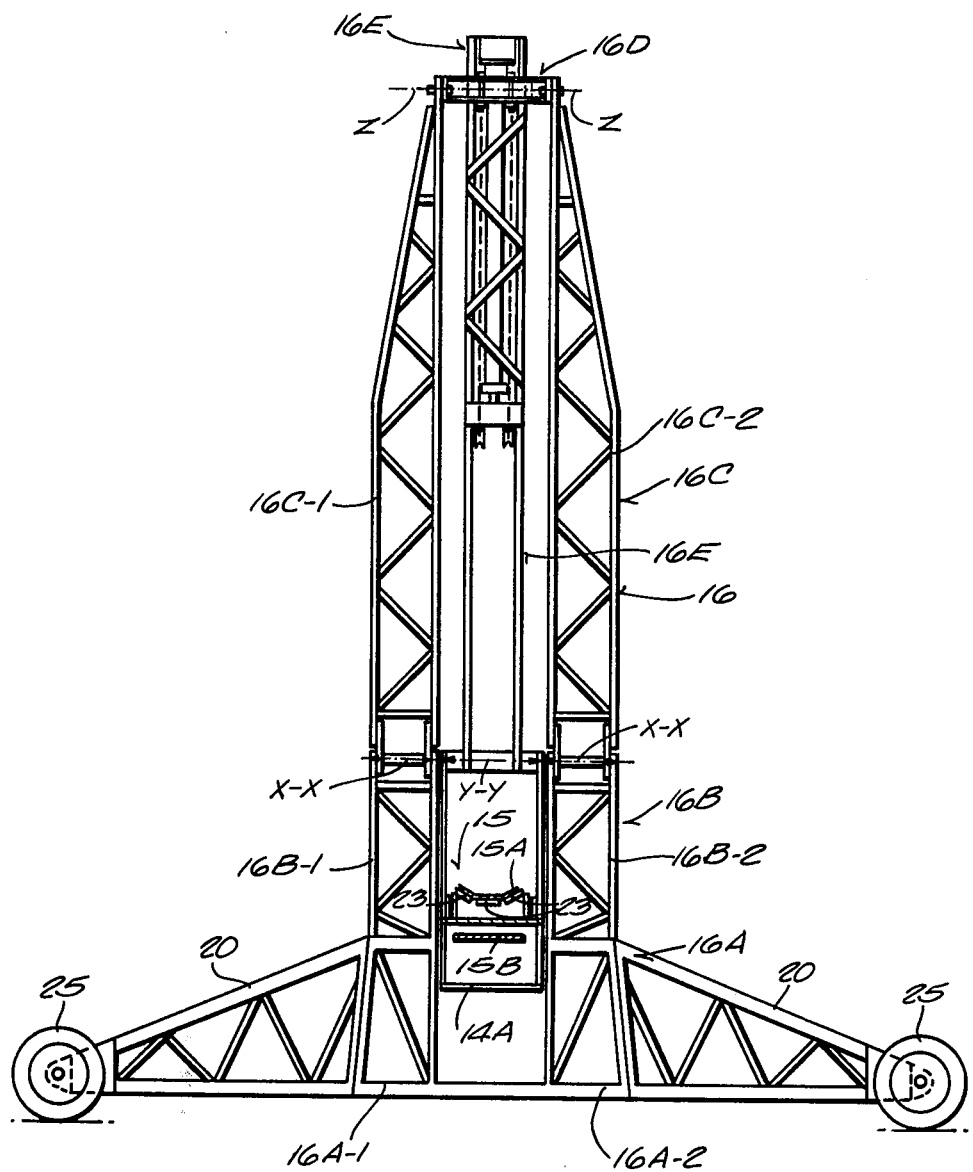
FIG. 4 is a view taken substantially along line IV—IV of FIG. 3.

When hydraulic fluid is admitted to the lower portion of ram cylinder 28A beneath the piston 28B, piston rod 28C moves outwardly to the extended position seen in the phantom view of FIG. 3 and in the full line view of FIGS. 5 and 6 to thereby swing mast section 16C in a counterclockwise direction relative to the views of FIGS. 3, 5 and 6 about the pivotal axis X—X to the folded position shown in FIGS. 3, 5 and 6. Since, at the time hydraulic ram 28 is energized, as just described, telescopic inner mast section 16E is in a retracted position within outer mast section 16C in which pivotal axis Y—Y at the lower end of inner mast section 16E is in alignment with or coincides with pivotal axis X—X of tower mast section 16C (FIG. 4), therefore, inner mast section 16E pivotally moves about axis Y—Y to folded position along with movement of outer mast section 16C to folded position about axis X—X.

When it is desired to move mast sections 16C and 16E from the folded position of FIGS. 5 and 6 to the erected position shown in FIGS. 3 and 4, hydraulic fluid is admitted to each ram cylinder 28A at the upper or outer end thereof to push the corresponding piston 28B downwardly or inwardly into ram cylinder 28A, to thereby swing the pivotally mounted tower mast section 16C and telescopic inner mast section 16E about the respective aligned pivotal axes X—X and Y—Y in a clockwise direction relative to the view in FIG. 3, causing mast section 16C (and the telescoped mast section 16E) to assume the position shown in full line in FIG. 3.

OPERATING MECHANISM FOR FOLDING STACKER FRAME SECTIONS

In order to effectuate the 180° swinging or folding movement of the various conveyor frame sections 14A, 14B, 14C, etc. with respect to each other, a hydraulic ram operating mechanism is provided for each pair of contiguous relatively foldable conveyor frame sections as will now be described. Thus, as seen in FIG. 1, a hydraulic ram generally indicated at 38AC is mounted on the left-hand end of middle frame section 14A relative to the views shown in the drawings for causing the pivotal folding action of the contiguous frame section 14C relative to the left-hand end of frame section 14A. Similarly, a hydraulic ram generally indicated at 38AD is mounted at the right-hand end (relative to FIG. 1) of middle conveyor frame section 14A to provide power for folding frame section 14D about the canted pivotal connection between frame sections 14A and 14D.

In a similar manner, a hydraulic ram generally indicated at 38BC is mounted on the left-hand end of conveyor frame section 14C (relative to FIG. 1) to provide the motive power for folding frame section 14B relative to frame section 14C; and, a fourth hydraulic ram generally indicated at 38DE is mounted on the right-hand end of conveyor frame section 14D to provide the motive power for folding frame section 14E upon frame section 14D.

Figure 9:
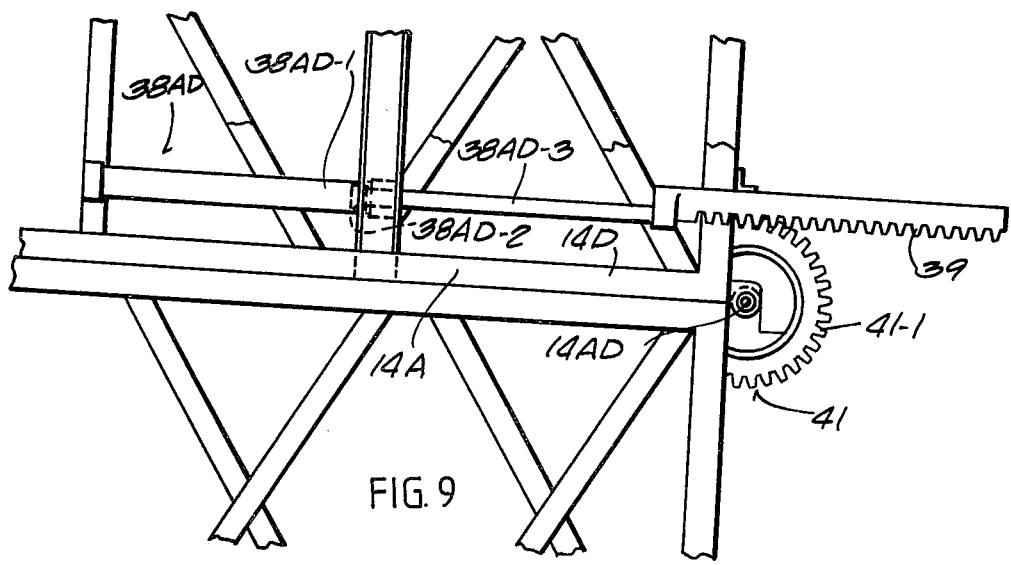
FIG. 9 is a view of the conveyor frame sections of FIGS. 7 and 8 rotated through 180° by the operating mechanism to a folded transport position.
Figure 8:
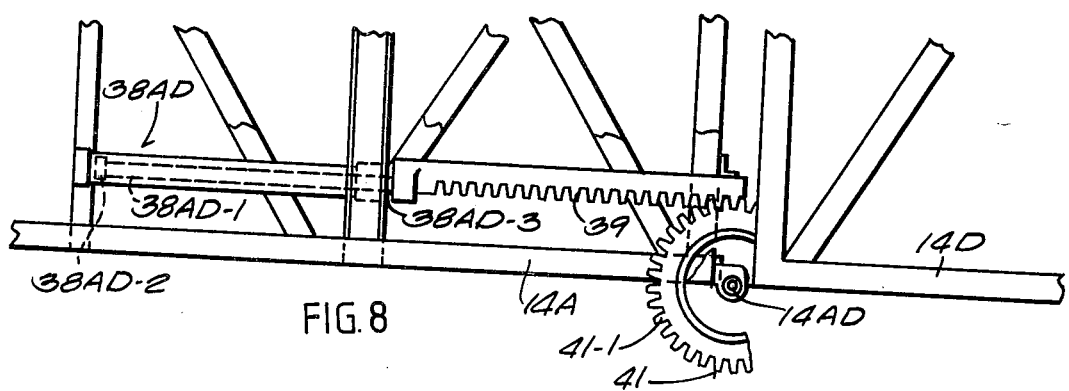
FIG. 8 is a top plan view of the adjacent frame sections and of the folding mechanism of FIG. 7 with the parts being shown in the same position as in FIG. 7.
Figure 7:
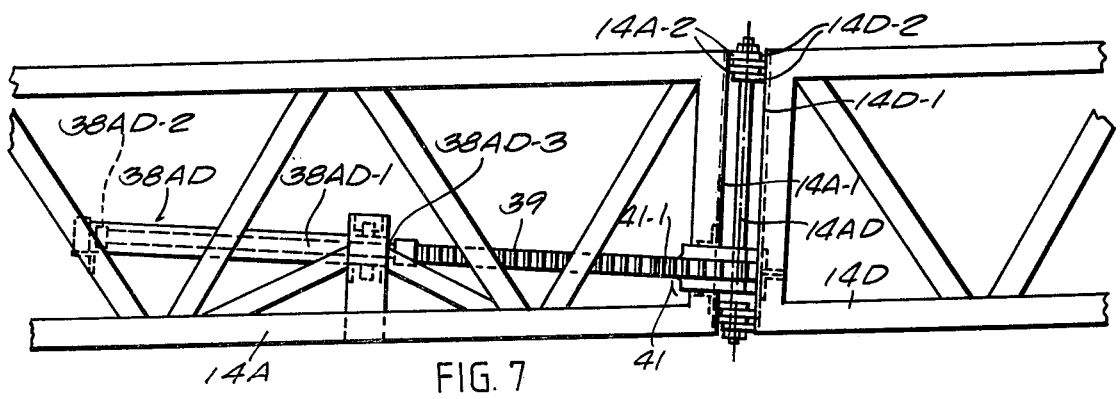
FIG. 7 is a view in longitudinal elevation of two pivotally connected conveyor supporting frame sections and of the hydraulically operated mechanism used for folding the adjacent frame sections through an angle of 180° with respect to each other, with the two adjacent frame sections being shown in aligned operative non-folded position.
Figure 10:
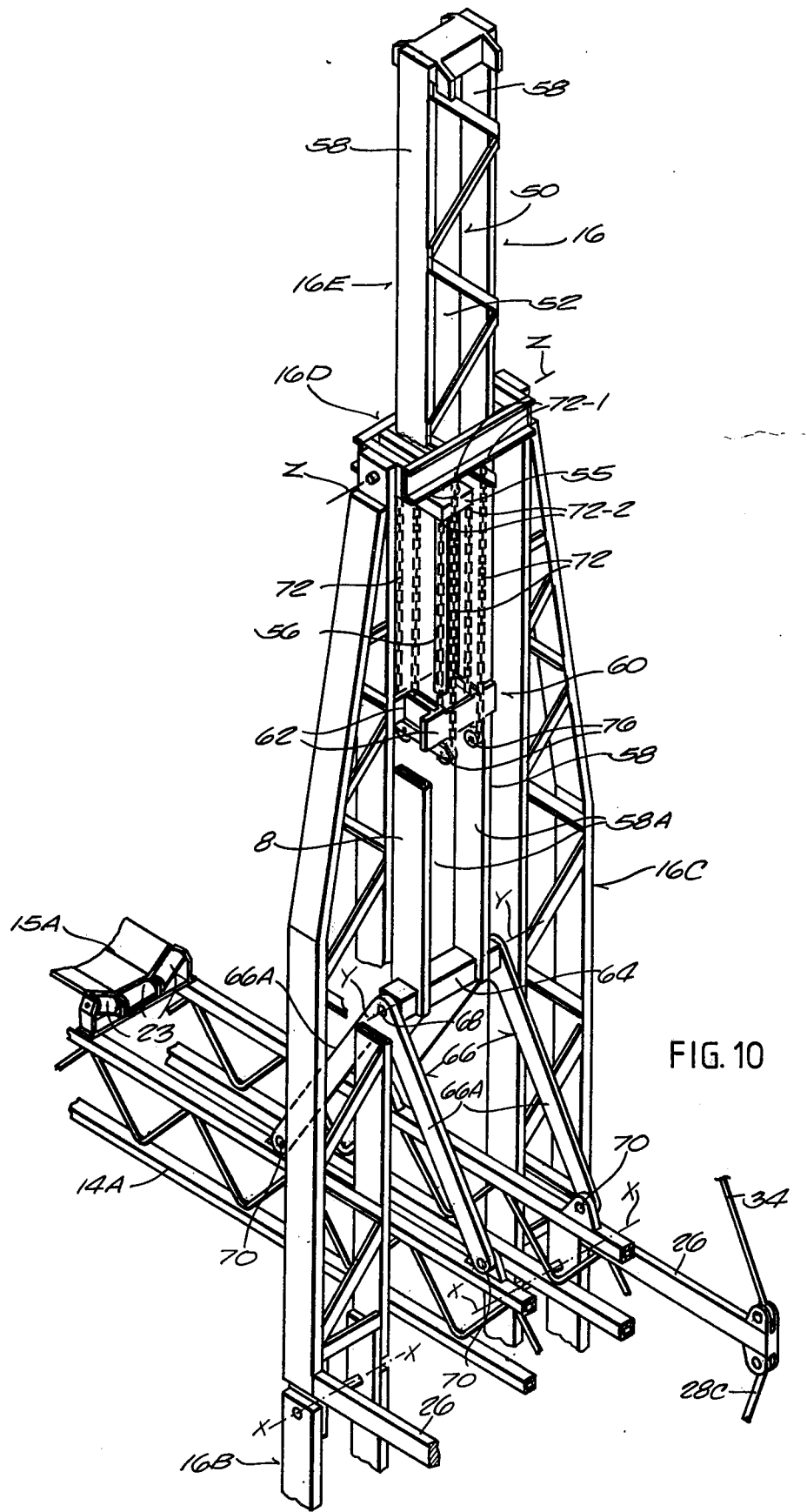
FIG. 10 is a perspective view of the mast structure and of the operating mechanism for raising and lowering the telescopic inner mast section.

Refer now to the views of FIGS. 7, 8 and 9 which show the canted pivotal connection between main conveyor frame section 14A and the contiguous wing frame section 14D, s typical of all of the canted pivotal connections between adjacent conveyor frame sections. It can be seen that each of the frame sections 14A, 14D is provided with ends 14A-1 and 14D-1, respectively, which are canted or inclined relative to an upright line normal to the longitudinal axis of conveyor supporting frame 14. The respective ends 14A-1, 14D-1 of conveyor frame sections 14A, 14D support tongue portions 14A-2 and 14D-2, respectively, which pivotally engage a pivot shaft 14AD which is upstanding from the longitudinal axis of the extended conveyor supporting frame 14, but is also canted with respect to line perpendicular or normal to the longitudinal axis of conveyor supporting frame 14.

Hydraulic ram 38AD is mounted on main or middle frame section 14A and includes a hydraulic cylinder 38AD-1 having a piston 38AD-2 movable therein and a piston rod 38AD-3 extending from piston 38AD-2. A rack gear 39 is secured to the outer end of piston rod 38AD-3.

A segmented pinion gear 41 having an arcuate span of 180° is fixedly secured to wing frame section 14D, with pinion gear 41 being so positioned on frame section 14D that the center of gear 41 from which all of the gear teeth 41-1 are equally radially spaced lies along the canted vertical pivotal axis 14AD for the two frame sections 14A and 14D.

The longitudinal axis of hydraulic ram 38 and of rack gear 39 mounted on piston rod 38AD-3 is at right angles to the axis of pivot rod 14AD.

In the position of conveyor support frame sections 14A and 14D shown in FIGS. 7 and 8 in which frame sections 14A and 14D are in unfolded aligned position with respect to each other, piston 38AD-2 is in contracted position at the left-hand end (with respect to the views of FIGS. 7, 8 and 9) of cylinder 38AD-1.

To swing conveyor wing frame section 14D through an angle of 180° from the unfolded position of FIGS. 7 and 8 to the folded position of FIG. 9, hydraulic fluid is admitted to cylinder 38AD-1 to the left of piston 38AD-2 and fluid is exhausted from cylinder 38AD-1 on the right of piston 38AD-2, with respect to the views shown in the drawings, causing rack gear 39 to drive segmented pinion gear 41 to the right relative to the views of FIGS. 7 and 8, causing rotation of pinion gear 41 and of conveyor support frame section 14D to which gear 41 is attached in a clockwise direction relative to the views of FIGS. 7 and 8. The parameters of rack gear 39 and pinion gear 41 are such that a complete expansion stroke of piston 38AD-2 and of piston rod 38AD-3 secured thereto will cause gear 41 to rotate 180° on the expansion stroke of piston 38AD-2 to cause a 180° folding movement of conveyor frame section 14D to which segmented pinion gear 41 is attached.

With conveyor frame section 14D in folded position as shown in FIG. 9, to move frame section 14D back to the extended position of FIGS. 7 and 8, hydraulic fluid is admitted to the right end of cylinder 38AD-1 and exhausted from the left end of cylinder 38AD-1 with respect to the views in FIGS. 7-9, inclusive, causing the piston, piston rod 38AD-3 and rack gear 39 to move from right to left. This will cause counterclockwise rotation of pinion gear 41 relative to the views in FIGS. 7-9, inclusive, and will cause conveyor frame section 14D to move through an angle of 180° about the canted vertical axis 14AD to assume the extended position of FIGS. 7 and 8.

DESCRIPTION OF OPERATING MECHANISM FOR VERTICALLY MOVING TELESCOPIC MAST SECTION 16E

The telescopically movable mast section generally indicated at 16E has a pair of parallel, laterally spaced upright guide members 58 vertically slidable through cross member or yoke 16D which is pivotally secured to the upper end of A-frame mast section 16C. Telescopic mast section 16E is shown in its fully extended position in FIGS. 1 and 2 and in its fully retracted position in FIGS. 3-6, inclusive. The mechanism for imparting upward or downward vertical movement to telescopic mast section 16E comprises a single acting hydraulic ram generally indicated at 50 which is part of and carried by mast section 16E, as best seen in the view of FIG. 10. Hydraulic ram 50 comprises a cylinder 52 and a piston 54 (not shown) movable in cylinder 52. A piston rod 56 is connected to piston 54 and projects through and beyond bottom cover plate 55 of hydraulic cylinder 52. The upper end of the hydraulic cylinder 52 is secured to the upper end of the telescopic mast section 16E. Guide members 58 of the telescopic mast section 16E serve as a guide for a slide member generally indicated at 60, which slideably engages the guide members 58 of the telescopic mast section 16E in all its raised and lowered positions, which is secured to and moves with the lower end of piston rod 56. Slide member 60 is provided on each of the opposite lateral sides thereof with spaced apart flange portions 62 which are adapted to slide along the opposite surfaces 58A of the respective vertical guide members 58 secured to cylinder 52.

A cross member 64 extends between the lower ends of the two laterally spaced vertical guide members 58, and a pair of link members generally indicated at 66 of generally "V" shape are respectively pivotally connected at 68 each to a corresponding opposite end of cross member 64 to define a pivotal axis Y—Y. Each link member 66 includes a pair of diverging arms 66A and the lower end of each of the arms 66A of each of the respective links 66 is pivotally connected as at 70 (FIG. 10) to the upper edge of main or middle conveyor frame section 14A. Thus, the upward or downward vertical movement of cylinder 52 and of the vertical guide members 58 connected to cylinder 52, as will be described, is imparted by means of spaced link members 66 to main conveyor frame section 14A and thus to the other conveyor frame sections 14B–14E, inclusive, connected thereto.

Vertical movement is imparted to hydraulic cylinder 52 and hence to conveyor frame 14 by means of a "bootstrap" type of operation which will now be described. A plurality of flexible members such as chains each indicated at 72 are connected at one end of each chain to cross member 16D at the upper end of mast section 16C, and at the other end of each chain to hydraulic ram cylinder 52, each of the chains 72 being trained around a corresponding rotatable idler such as sprocket member 76 carried by slide 60 secured to piston rod 56, in such manner that vertical movement of piston 54 (not shown) and piston rod 56 in a given direction relative to hydraulic ram cylinder 52 causes a vertical movement of ram cylinder 52 relative to A-frame mast sections 16C and 16D and in a direction which is opposite to the direction of movement of piston 54 and piston rod 56 relative to cylinder 52. Furthermore, for a displacement of piston 54 in a given direction relative to cylinder 52, by one unit of distance, cylinder 52 will have a displacement in an opposite direction relative to A-frame members 16C and 16D of two units of distance. Since vertical guide members 58 are secured to and move with hydraulic cylinder 52 and are connected to conveyor frame 14 through links 66, therefore the vertical movement of hydraulic cylinder 52 causes a corresponding vertical movement of conveyor frame 14. One end of each chain 72 is connected at a corresponding point 72-1 to pivotally mounted cross member or yoke 16D. Each chain 72 extends from its fixed connection 72-1 downwardly and around a corresponding chain sprocket 76 which is mounted for rotation at the lower end of slide member 60. Each chain 72 after passing around a corresponding sprocket member 76 thence passes upwardly where it is anchored or fixed at a corresponding point 72-2 to bottom plate 55 of hydraulic ram cylinder 52. Each of the chains 72 is connected in the manner just described.

The concept of a telescopically movable member which operates on the "bootstrap" principle in a manner generally similar to that shown and described in connection with telescopic mast section 16E of the present application is shown by U.S. Pat. No. 3,208,556, of Walter M. Shaffer, which issued on Sept. 28, 1965, and which shows such an arrangement in connection with the telescopic mast of a fork lift truck.

When telescopic mast section 16E and the ram assembly 50 forming a part thereof are in the substantially completely retracted position of FIGS. 3 and 4, piston 54 is near the upper end of cylinder 52 and piston rod 56 extends for most of its length inside cylinder 52, with only a short portion of piston rod 56 projecting below the lower end of cylinder 52. Hence, when it is desired to move telescopic mast section 16E from the retracted position of FIGS. 3 and 4 to the fully extended position of FIGS. 1 and 2, hydraulic fluid is admitted to the upper end of cylinder 52 above piston 54, and exhausted from the lower end of cylinder 52 beneath piston 54 to cause piston 54 to expand downwardly in cylinder 52. Due to the connection of chains 72 to cross member 16D and to the lower end of ram cylinder 52 as previously described and as shown in FIG. 10, the expansion movement of piston 54 and piston rod 56 relative to cylinder 52 causes upward vertical movement of cylinder 52, and of vertical mast section 16E of which ram assembly 50 forms a part, relative to A-frame mast sections 16D and 16C, and also causes upward vertical movement of conveyor supporting frame 14 which is supported by and moves vertically with telescopic mast section 16E.

Conversely, when telescopic mast section 16E and ram assembly 50 forming a part thereof are in the substantially completely extended position of FIGS. 1 and 2, piston 54 is in its fully expanded position contiguous the lower end of cylinder 52, and piston rod 56 extends for most of its length outside cylinder 52. Hence, when it is desired to move telescopic mast section from the extended or erected position of FIGS. 1 and 2 to the retracted position of FIGS. 3 and 4, preparatory to moving mast structure 16 and conveyor supporting frame 14 to the transport position of FIGS. 5 and 6, hydraulic fluid is exhausted from the upper end of cylinder 52 above piston 54 of the single acting hydraulic ram 50 by opening a suitable valve. The force of gravity will cause ram cylinder 52 and consequently telescopic mast section 16E, of which ram cylinder 52 forms a part, to move downwardly relative to A-frame mast sections 16C and 16D to finally assume the fully retracted position of FIGS. 3 and 4. In the fully retracted position of FIGS. 3 and 4, piston 54 and piston rod 56 will have contracted in cylinder 52, to a position in which piston 54 is at the upper end of cylinder 52.

A hydraulic power pack generally indicated at 78 (FIG. 1) for hydraulic ram 50 and including a pump and hydraulic reservoir is suitably mounted on middle conveyor frame section 14A in suitable clearing relation to conveyor belt 15, and is suitably connected as by flexible hoses to hydraulic ram 50.

As best seen in the view of FIG. 1, a plurality of cables is connected to the stacker structure in order to assist in maintaining the stacker in the erected position shown in FIG. 1. Thus, a first cable C-1 is connected between point 80 on the under surface of conveyor frame section 14B contiguous the outer or left-hand end thereof relative to the view in FIG. 1 and a point 82 at the lower end of A-frame or mast structure 16. A second cable C-2 is connected between an intermediate point on the normally upper surface of conveyor frame section 14B and the upper end of telescopic mast section 16E. A third cable C-3 is connected from an intermediate point of the upper edge of conveyor frame section 14C and the upper end of telescopic mast section 16E. Similarly, a fourth cable C-4 is connected from an intermediate point of the upper edge of conveyor frame section 14D and the upper end of telescopic mast section 16E; and a sixth cable C-5 is connected from an intermediate point of the upper edge of conveyor frame section 14E to the upper end of telescopic mast section 16E.

Thus, it can be seen that main or middle conveyor frame section 14A is directly mechanically connected to and supported from the lower end of telescopic mast section 16E by links 66 and that conveyor frame sections 14B, 14C, 14D and 14E in addition to being pivotally connected to corresponding contiguous conveyor frame sections are additionally connected to and supported from the upper end of telescopic mast section 16E by cables C-2, C-3, C-4 and C-5 as hereinbefore described and as shown in FIG. 1.

DESCRIPTION OF STACKER LOWERING AND FOLDING OPERATION

Assume that the stacker apparatus is in the erected position shown in FIGS. 1 and 2 and that it is desired to lower and fold the stacker apparatus for transport.

(1) In the erected position of FIGS. 1 and 2 in which hydraulic cylinder 52 of hydraulic ram 50 and guide members 58 secured to cylinder 52 (all forming part of telescopic mast section 16E) are at their maximum elevated position, and in which piston 54 is positioned contiguous the bottom end of cylinder 52, hydraulic fluid is exhausted from a suitable exhaust port in the upper end of cylinder 52 above piston 54 of the single acting hydraulic ram 50. The force of gravity will cause ram cylinder 52 and consequently telescopic mast section 16E of which ram cylinder 52 forms a part to move downwardly relative to A-frame mast sections 16C and 16D to finally assume the fully retracted position of FIGS. 3 and 4. The downward movement of telescopic mast section 16E causes the downward movement of main conveyor frame section 14A and of the other frame sections 14B–14E, inclusive, connected to frame section 14A, since conveyor frame section 14A is suspended from the lower end of guide members 58 by links 66. The downward movement of telescopic mast section 16E as just described causes conveyor supporting frame 14 to move from the elevated position of FIGS. 1 and 2 to the substantially horizontal position of FIGS. 3 and 4.

When the conveyor support frame 14 has been lowered to the horizontal position of FIG. 3, the ends of cables C-2, C-3, C-4 and C-5 may be disconnected from their connections to conveyor support frame 14. Cable C-1 is also disconnected from its connections to conveyor frame section 14B and to lower base section 16A of mast 16.

It will be noted that in the initial fully erected position of the telescopic mast section 16E, as seen in FIGS. 1 and 2, mast section 16E is angularly inclined by an angle $\theta$ from the longitudinal axis of A-frame mast section 16C, and that as mast section 16E telescopically moves downwardly through pivotally mounted cross member 16D at the upper end of stationary mast section 16C telescopic mast section 16E eventually assumes a position by the time it reaches fully retracted position as shown in FIGS. 4–6, inclusive, in which the longitudinal axis of mast section 16E is coincident with the longitudinal axis of A-frame mast section 16C. The pivotally mounted cross member 16D accommodates the changing angular position of telescopic mast section 16E just described.

It will be noted that in the retracted position of telescopic mast section 16E shown in FIGS. 3 and 4 the pivotal axis Y—Y about which link members 66 are pivotally connected to the lower end of telescopic mast section 16E lies along a common horizontal axis with the the axis X—X about which A-frame section 16C is pivotally foldable with respect to A-frame section 16B.

With telescopic mast section 16E in the fully retracted position of FIGS. 3–6, inclusive, as just described and with pivotal axis Y—Y of telescopic mast section 16E being co-linear with pivotal axis X—X of A-frame sections 16C and 16B, as just described, A-frame mast section 16C and the fully retracted inner telescopic mast section 16E which is telescopically received within A-frame mast sections 16B and 16C may then both be folded from the vertical position shown in full line in FIGS. 3 and 4 to the substantially horizonal folded position shown in phantom in the view of FIG. 3 and in full line in the views of FIGS. 5 and 6. This folding action is accomplished by introducing hydraulic fluid into the lower end of hydraulic cylinder 28A of hydraulic rams 28 to cause movement of piston 28B and piston rod 28C to the extended position shown in phantom in FIG. 3 and in full line in FIGS. 5 and 6. Since the outer end of each piston rod 28C is connected at point 32 to a corresponding erecting arm 26 which in turn is secured to A-frame section 16C, the movement of piston rod 28C to the extended position seen in FIGS. 3, 4 and 5 causes A-frame mast section 16C to pivotally move in a counterclockwise direction relative to the views seen in FIGS. 3 and 5 about pivotal axis X—X to cause A-frame mast section 16C to move to the substantially horizontal folded position as seen in the views of FIGS. 3 and 5. Simultaneously with the pivotal folding movement of mast section 16C, as just described, inner telescopic mast section 16E which is received within outer mast section 16C also folds about pivotal axis Y—Y to a substantially horizontal position.

When mast section 16C and the fully retracted telescopic mast section 16E have been folded together to the horizontal transport position shown in phantom in FIG. 3 and in full line in FIGS. 5 and 6, the ends of cables C-2 through C-5, inclusive, may be disconnected from the outer end of telescopic mast section 16E, if desired.

With conveyor supporting frame 14 in the lowered but fully extended position shown in FIG. 3, in order to fold conveyor frame 14 to the transport position shown in FIGS. 5 and 6, outer wing conveyor frame section 14B is swung or folded 180° in a counterclockwise direction (relative to FIG. 1) about the canted pivotal axis between conveyor frame sections 14B and 14C in a counterclockwise direction as viewed in FIG. 5 by energizing hydraulic ram 38BC which supplies power for swinging frame section 14B through the 180° movement in a counterclockwise direction with respect to inner wing conveyor frame section 14C.

Due to the canted pivotal axis between conveyor frame sections 14B and 14C, after frame section 14B has been folded through an angle of 180° as just described frame section 14B will lie in a vertical plane substantially parallel to the vertical plane of frame section 14C and the longitudinal axis of frame section 14B will be inclined upwardly at an angle with respect to the longitudinal axis of frame section 14C, as best seen in the view of FIG. 5, with the free end of section 14B being offset above section 14C.

After frame section 14B has been folded onto frame section 14C, as just described, frame section 14C is then swung through an angle of 180° in a counterclockwise direction as viewed in the drawings about the canted pivotal axis between wing frame section 14C and main or middle frame section 14A, using hydraulic ram 38AC as a source of motive power for the swinging movement.

When frame section 14C is swung in a counterclockwise direction as just described, frame section 14C will lie in a vertical plane substantially parallel to the vertical plane of middle frame section 14A and the longitudinal axis of frame section 14C will be inclined upwardly with respect to the longitudinal axis of middle frame section 14A; and so that the end of section 14C which is pivotally connected to section 14B will be offset above section 14A. In this fully folded position of sections 14B and 14C, the outer wing frame section 14B will lie in vertically overlying, juxtaposed relation to and in substantially a common vertical plane with the underlying main frame section 14A.

Outer wing conveyor frame section 14E is then swung through an angle of 180° in a clockwise direction relative to the views in the drawings about the slightly canted pivotal axis between frame sections 14E and 14D, using hydraulic ram 38DE as a source of motive power, and then frame section 14D is swung in a clockwise direction through an angle of 180° about the canted pivotal axis between frame section 14D and main or middle frame section 14A, using hydraulic ram 38AD as a source of motive power, all in the same manner as described in connection with frame sections 14B and 14C. When frame sections 14D and 14E have been folded as just described, frame section 14D will lie in a vertical plane substantially parallel to the vertical plane of middle frame section 14A, with the longitudinal axis of frame section 14D being inclined upwardly with respect to the longitudinal axis of middle frame section 14A; and the longitudinal axis of outer wing frame section 14E will be inclined upwardly with respect to the longitudinal axis of frame section 14D, with frame section 14E lying above but in substantially a common vertical plane with middle frame section 14A.

Wheel support brackets 20 which extend transversely of the longitudinal axis of conveyor supporting frame 14 in the operative position of stacker apparatus 10 in FIGS. 1 and 2 and in the partially collapsed position of the stacker apparatus shown in FIGS. 3 and 4, are folded inwardly to the transport position of FIGS. 5 and 6 in which wheel support brackets 20 extend parallel to the longitudinal axis of main or middle frame section 14A.

It can be seen that due to the canted construction of the pivotal connections or hinge axis between adjacent conveyor frame sections that the conveyor frame can be folded compactly in such manner as to minimize the lateral space and also the vertical space or head room occupied by the folded conveyor frame sections, which is obviously an advantage during the transport of the stacker apparatus.

RAISING THE STACKER APPARATUS FROM TRANSPORT POSITIION TO ERECTED POSITION

Assume that the stacker apparatus is in the transport position shown in FIGS. 5 and 6 and that it is desired to erect the stacker apparatus. The following steps are followed:

(1) Wheel support brackets 20 which extend parallel to the longitudinal axis of conveyor supporting main frame section 14A in the transport position of FIGS. 5 and 6 are swung 90° around their respective pivotal supports to the operational position shown in FIGS. 1-4, inclusive.

(2) Hydraulic rams 28 which are associated with the two erecting arm 26 for mast section 16C are activated by introducing hydraulic fluid into the upper end of each ram cylinder 28A to cause piston rod 28C and the piston connected thereto to move downwardly in ram cylinder 28A with respect to the view shown in FIG. 5 whereby to move A-frame mast section 16C to vertical position through the connection of each piston rod 28C to point 32 on a corresponding erecting arm 26 (FIG. 5).

(3) Conveyor frame sections 14C and 14B, with conveyor frame section 14B in folded position relative to frame section 14C are swung together in a clockwise direction from the FIGS. 5 and 6 positions through an angle of 180° about the canted pivotal axis between main or middle frame section 14A and frame section 14C, using hydraulic ram 38AC as a source of motive power. After the completion of this 180° swinging movement, conveyor frame section 14B is then swung in a clockwise direction through an angle of 180° about the canted pivotal axis between frame sections 14B and 14C, using hydraulic ram 38BC as a source of motive power.

(4) Conveyor frame sections 14D and 14E are opened up in the same manner as just described in connection with frame sections 14C and 14B, using hydraulic rams 38AD and 38DE as the respective sources of motive power. When all of the conveyor frame unfolding movements have been completed as just described, conveyor frame 14 will be in fully opened up elongated position such as that shown in FIG. 1 in which all of the pivotally connected frame sections 14A-14E, inclusive, are in alignment with each other.

(5) The ends of cables C-1 through C-5, inclusive, may then be connected to the various conveyor frame sections 14B, 14C, etc., and to the outer end of telescopic mast section 16E as required as shown in FIG. 1.

(6) Telescopic mast section 16E which, when the stacker apparatus was in transport position, was fully retracted into A-frame mast sections 16C and 16B, is activated to move telescopic mast section 16E to the fully elevated position as seen in FIGS. 1 and 2. When telescopic mast section 16E is in the retracted position of FIGS. 3 and 4, piston 54 of hydraulic ram 50 which forms a part of telescopic mast section 16E is in the contracted position at the upper end of hydraulic ram cylinder 52 relative to the views of FIGS. 3 and 4. To raise telescopic mast section 16E from the retracted to the elevated position, hydraulic fluid is admitted into cylinder 52 above piston 54, and hydraulic fluid is exhausted from beneath piston 54, causing piston 54 to expand downwardly in cylinder 52 to finally approach and reach the lower end of cylinder 52 as seen in FIG. 2. The downward movement of piston 54 relative to cylinder 52 causes the downward (relative to cylinder 52) movement of sliding carriage 60 which is mounted on the lower end of piston 56. The connection of chains 72 from pivotally mounted stationary mast cross member 16D, around chain sprockets 76 carried by slide member 60, and thence to the lower end of ram cylinder 52, causes ram cylinder 52 to move upwardly to the elevated position of FIGS. 1 and 2 relative to A-frame mast structure 16C, during the expansion movement of piston 54 downwardly relative to cylinder 52. The upward movement of ram cylinder 52 to the elevated position of FIGS. 1 and 2 moves conveyor frame 14 upwardly to the elevated position of FIGS. 1 and 2 due to the connection of guide members 58 which are secured to and move with cylinder 52 to conveyor support frame 14 through link members 66.

DESCRIPTION OF MODIFIED EMBODIMENT OF FIGS. 11–16, INCLUSIVE

Referring now to FIGS. 11–16, inclusive, there is diagrammatically shown a modified type of conveyor supporting framework generally indicated at 140 comprising a middle frame section 140A, two contiguous outer and inner wing frame sections 140B and 140C, respectively, lying to the left of middle frame section 140A with respect to the views shown in the drawings, and two contiguous inner and outer wing frame sections 140D and 140E, respectively, which lie to the right of middle frame section 140A with respect to the views shown in the drawings. Middle frame section 140A is connected to inner wing frame section 140C by a pivotal or hinge axis 140AC which lies in a horizontal plane and is canted or inclined relative to a line lying in a horizontal plane and normal to the longitudinal axis of the extended conveyor supporting framework as seen in the views of FIGS. 11 and 12. Similarly, inner wing frame section 140C is connected at its left-hand end with respect to the views in the drawings to outer wing frame section 140B by canted pivotal axis 140BC. The right-hand edge of middle frame section 140A is pivotally connected to inner wing frame section 140D by a canted pivotal axis 140AD; and the right-hand end, with respect to the views shown in drawings of the inner wing frame section 140D is pivotally connected to outer wing frame section 140E along a canted pivotal axis 140DE. Each canted pivotal axis just defined lies in a horizontal plane and is canted or inclined relative to a line also lying in the horizontal plane and normal to the longitudinal axis of the extended supporting frame 140 as viewed in FIGS. 1 and 2.

As best seen in the views of FIGS. 13 and 14, the first step in folding conveyor supporting frame 140 from the operational in-use position of FIGS. 11 and 12 to the transport position of FIGS. 15 and 16 is to fold each of the outer wing frame sections 140B and 140E about their respective canted pivotal axes 140BC and 140DE to the position shown in FIGS. 13 and 14, each of the respective outer wing frame sections 140B and 140E being folded through an angle of 180° about its corresponding canted pivotal axis.

Wing section 140B is rotated through the 180° angle in a clockwise direction with respect to the views in the drawings and wing section 140E is rotated through the 180° angle in a counterclockwise direction with respect to the views in the drawings. When the 180° folding movement of the two outer wing sections has been completed, each of the respective wing sections 140B and 140E will lie in superposed or overlying parallel plane relation to the corresponding contiguous wing section 140C or 140D, and each of the respective outer wing sections 140B and 140E in the folded position of FIGS. 13 and 14 will lie with the longitudinal axis thereof at an inclination to, but in a parallel plane with, the longitudinal axis of its contiguous wing frame section 140C or 140D, as the case may be.

To fold conveyor support framework 140 from the intermediate position of FIGS. 13 and 14 to the final transport position of FIGS. 15 and 16, wing frame section 140C is then folded with respect to the middle frame section 140A through an angle of 180° in a clockwise direction with respect to the views in FIGS. 11–16, inclusive, about canted pivotal axis 140AC. Wing frame section 140D is folded with respect to middle frame section 140A through an angle of 180° in a counter-clockwise direction about canted pivotal axis 140AD. After the second folding action just described has been completed, the frame sections of conveyor supporting frame 140 then occupy the positions as shown in FIGS. 15 and 16 in which the two inner wing frame sections 140C and 140D, respectively, lie with their respective longitudinal axes inclined relative to the longitudinal axis of middle frame section 140A; and the respective outer wing frame sections 140B and 140E lie in substantially a common horizontal plane with middle frame section 140A.

The canting of pivotal axis 140AC between inner wing frame section 140C and middle frame section 140A should be related to the length of frame section 140C so that in the final folded position of FIGS. 15 and 16 the pivotal axis 140BC between frame sections 140C and 140B has sufficient clearance with respect to longitudinal edge 140F of middle frame section 140A to permit outer frame section 140B to lie in a common horizontal plane with middle frame section 140A without interference. What has just been stated in the present paragraph with respect to inner wing frame section 140C, canted pivotal axis 140AC, the clearance between canted pivotal axis 140BC and longitudinal edge 140F and the co-planar relation between outer wing frame section 140B and middle frame section 140A also applies equally to corresponding parts contiguous the opposite end of middle frame section 140A.

The conveyor supporting frame 140 of FIGS. 11–16, inclusive, can be used with the mast structure and other elements shown in the views of FIGS. 1–10, inclusive, in the same manner as conveyor supporting frame 14 of FIGS. 1–10, inclusive.

It might be noted that the distribution of weight on conveyor support frame 14 is such that in the erected operative position of FIG. 1, the force of gravity causes the conveyor to assume the inclined position shown in FIG. 1 in which the loading end is at the lower end of the inclined conveyor and the discharge end is at the upper end of the inclined conveyor.

From the foregoing detailed description of the invention, it has been shown how the objects of the invention have been obtained in a preferred manner. However, modifications and equivalents of the disclosed concepts such as readily occur to those skilled in the art are intended to be included within the scope of this invention.

The embodiments of the invention in which an exclusive property or privilege is claimed are defined as follows:

1. A portable elevating conveyor for use in a luffing stacker or the like, comprising an elongated conveyor supporting framework, a mast structure comprising a tower mast section mounted on a base mast section and extending above said base mast section when in operating position, said tower mast section being mounted for folding pivotal movement relative to said base mast section about a substantially horizontal first pivotal axis to move said mast structure from an operational to a transport position or vice-versa, and a telescopic mast section mounted for telescopic movement relative to said tower mast section, means connecting the lower end of said telescopic mast section to said conveyor supporting framework on a substantially horizontal second pivotal axis, whereby vertical upward or downward movement of said telescopic mast section is imparted to said conveyor supporting framework, said telescopic mast section being movable vertically downwardly relative to said tower mast section to a retracted position in which said second pivotal axis at said lower end of said telescopic mast section coincides with said first pivotal axis between said tower mast section and said base mast section, whereby said tower mast section may be folded about said first pivotal axis relative to said base mast section simultaneously with and together with the folding of said telescopic mast section about second pivotal axis.

2. A portable elevating conveyor as defined in claim 1 in which said elongated elevating conveyor supporting framework when in fully extended position is movable from a substantially horizontal position to an operative position in which it is upwardly inclined from the feed end to the discharge end thereof, and in which said tower mast section includes at the upper end thereof a guide member mounted on said tower mast section for pivotal movement about a substantially horizontal axis, said guide member having a passage therethrough which slidably receives said telescopic mast section whereby to guide said telescopic mast section during vertical movement thereof, said guide member due to its pivotal mounting accommodating changing angular positions of said telescopic mast section in moving from fully retracted to fully extended position or vice-versa.

3. An elevating conveyor for use in a luffing stacker or the like, comprising an elongated conveyor supporting framework, a mast structure comprising a tower mast section mounted on a base mast section, and a telescopic mast section slideably mounted on said tower mast section for telescopic movement relative thereto, means connecting the lower end of said telescopic mast section to said conveyor supporting framework whereby vertical upward or downward movement of said telescopic mast section is imparted to said conveyor supporting framework, and means for imparting vertical movement to said telescopic mast section comprising a hydraulic ram assembly forming part of and movable with said telescopic mast section, said hydraulic ram assembly comprising a ram cylinder element, a piston movable in said cylinder, and a piston rod element carried by and movable with said piston and projecting beyond the end of said cylinder, slide means carried by and movable with one of said elements, said slide means slideably engaging said telescopic mast section in all positions of the latter without contact with said tower mast section, a rotatable idler rotatably mounted on said slide means, a flexible member, said flexible member being trained around said idler, said flexible member having its opposite ends connected respectively to said tower mast section and to the other of said elements.

4. An elevating conveyor as defined in claim 3 in which said slide means is carried by and movable with said piston rod element.

5. A portable elevating conveyor for use in a luffing stacker or the like, comprising an elongated conveyor supporting framework, a mast structure comprising a tower mast section mounted on a base mast section and extending above said base mast section when in operating position, said tower mast section being mounted for folding pivotal movement relative to said base mast section about a substantially horizontal first pivotal axis to move said mast structure from an operational to a transport position or vice-versa, a telescopic mast section mounted for telescopic movement relative to said tower mast section, means connecting the lower end of said telescopic mast section to said conveyor supporting framework on a substantially horizontal second pivotal axis whereby vertical upward or downward movement of said telescopic mast section is imparted to said conveyor supporting framework, said telescopic mast section being movable vertically downwardly relative to said tower mast section to a retracted position in which said second pivotal axis at said lower end of said telescopic mast section coincides with said first pivotal axis between said tower mast section and said base mast section, whereby said tower mast section may be folded about said first pivotal axis relative to said base mast section simultaneously with and together with the folding of said telescopic mast section about second pivotal axis, and means for imparting vertical movement to said telescopic mast section comprising a hydraulic ram assembly forming part of and movable with said telescopic mast section, said hydraulic ram assembly comprising a ram cylinder element, a piston movable in said cylinder, and a piston rod element carried by and movable with said piston and projecting beyond the end of said cylinder, slide means carried by and movable with one of said elements, a rotatable idler rotatably mounted on said slide means, a flexible member, said flexible member being trained around said idler, said flexible member having its opposite ends connected respectively to said tower mast section and to the other of said elements.

6. A portable elevating conveyor as defined in claim 5 in which said elongated conveyor supporting framework when in fully extended position is movable from a substantially horizontal position to an operative position in which it is upwardly inclined from the feed end to the discharge end thereof, and in which said tower mast section includes at the upper end thereof a guide member mounted on said tower mast section for pivotal movement about a substantially horizontal axis, said guide member having a passage therethrough which slidably receives said telescopic mast section whereby to guide said telescopic mast section during vertical movement thereof, said guide member due to its pivotal mounting accommodating changing angular positions of said telescopic mast section in moving from fully retracted to fully extended position or vice-versa.

7. An elevating conveyor as defined in claim 5 in which said slide means is carried by and movable with said piston rod element.

8. An elevating conveyor as defined in claim 5 in which said slide means is carried by and movable with said ram cylinder element.

9. A conveyor for use in a portable luffing stacker or the like foldable from an extended operational position to a compactly folded transport position, comprising a multi-section conveyor frame adapted to support a conveyor means, said frame including
a first elongated frame section having longitudinally opposite ends,
a second elongated frame section having one of its longitudinally opposite ends pivotally connected to one of the ends of said first section for pivotal movement about a pivot axis canted relative to a plane normal to the longitudinal axes of said first and second sections from an operating position in which said longitudinal axes of said first and second sections are a common axis through 180 degrees to a canted folded position alongside said first section wherein the other end of said second section is offset from said first section, and
a third elongated frame section having one of its longitudinally opposite ends connected to said other end of said second section for pivotal movement about a pivot axis canted relative to a plane normal to the longitudinal axes of said second and third sections from an operating position in which said axes of said second and third sections are a common axis through 180 degrees to a canted folded position alongside said second section wherein the other end of said third section is offset from said second section, when said second and third sections are in their folded positions said third section is in juxtaposed relation to said first section, the axes of said first and third sections lie in a common plane and said second section extends diagonally alongside said first and third sections in spaced relation to common said plane.

10. The conveyor of claim 9 wherein said pivot axes lie in a vertical plane.

11. The conveyor of claim 9 wherein said pivot axes are horizontally disposed.

12. The conveyor of claim 9 and further comprising a fourth elongated frame section having one of its longitudinally opposite ends pivotally connected to the other of the ends of said first section for pivotal movement about a pivot axis canted relative to a plane normal to the longitudinal axes of said first and fourth section from an operating position in which said longitudinal axes of said first and fourth sections are a common axis through 180 degrees to a canted folded position alongside said first section wherein the other end of said fourth section is offset from said first section, and a fifth elongated frame section having one of its longitudinally opposite ends connected to said other end of said fourth section for pivotal movement about a pivot axis canted relative to a plane normal to the longitudinal axes of said fourth and fifth sections from an operating position in which said axes of said fourth and fifth sections are a common axis through 180 degrees to a canted folded position alongside said fourth section wherein the other end of said fifth section is offset from said fourth section, when said fourth and fifth sections are in their folded positions said fifth section is in juxtaposed relation to said first section, the axes of said first and fifth sections lie in the same plane and said fourth section extends diagonally alongside said first and fifth sections in spaced relation to said same plane.

13. The conveyor of claim 12 wherein said pivot axes lie in a vertical plane.

14. The conveyor of claim 12 wherein said pivot axes are horizontally disposed.

* * * * *